(No Model.)
J. M. YOUNG.
REEL SPOOL FOR WIRE.
No. 292,610. Patented Jan. 29, 1884.
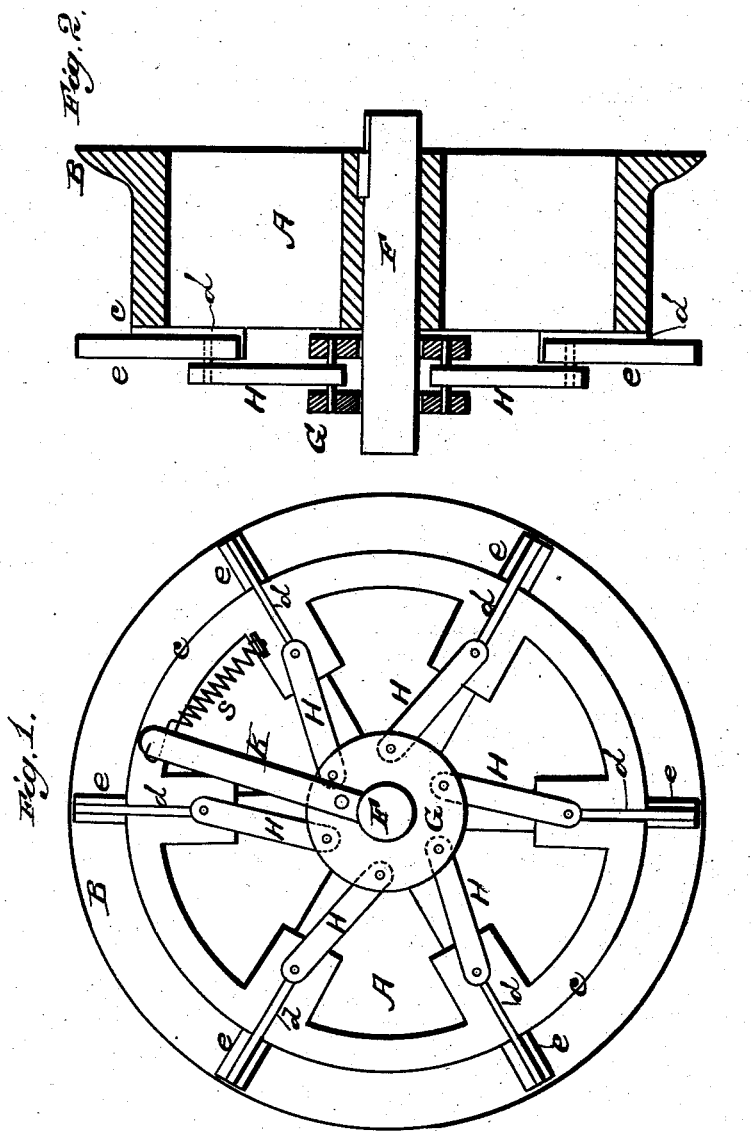
WITNESSES
E. H. Bates,
Philip Lewasi
INVENTOR
J. M. Young,
by Anderson Smith
his ATTORNEYS

UNITED STATES PATENT OFFICE.

JOSEPH M. YOUNG, OF JOHNSTOWN, PENNSYLVANIA.

REEL-SPOOL FOR WIRE.

SPECIFICATION forming part of Letters Patent No. 292,610, dated January 29, 1884.

Application filed April 21, 1883. (No model.)

*To all whom it may concern:*

Be it known that I, JOSEPH M. YOUNG, a citizen of the United States, residing at Johnstown, in the county of Cambria and State of Pennsylvania, have invented certain new and useful Improvements in Reel-Spools; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a side view of my device, and Fig. 2 is a vertical sectional view of the same.

This invention has relation to spooling blocks or reels for wire; and it consists in the construction and novel arrangement of devices, as hereinafter set forth, and particlarly pointed out in the appended claim.

In the accompanying drawings, the letter A designates the body of the spool, which is usually made with one permanent flange, B, the other side of the spool being without a flange, as indicated at $c$. In the side of the spool are made guides or guideways $d$, extending radially outward to the marginal portion of the plain or flangeless side, and in said ways or engaging the guides are the radially-sliding arms $e$.

F represents the revolving shaft to which the reel-spool is keyed. On said shaft, at the side of the spool, is seated a loose disk or pair of disks, G, to which are pivoted short connecting-bars H, the outer ends of which are pivoted to the sliding arms $e$. The disk-head G is provided with an arm or handle device, K, and a spring, $s$, secured at one end to the said handle or arm, and at its opposite end to the side C of the spool, which serves to hold the disk in position to cause the arms or fingers $e$ to project beyond the marginal portion of the flangeless side of the spool to serve as a guard to keep the wire on the spool while it is being wound. By reversing the movement of the disk-head G the arms or fingers $e$ will be retracted on the flangeless side of the spool, leaving its peripheral surface free on this side to allow the wire bundle to be easily and quickly removed from the spool or reel block while the latter continues in motion.

This invention is designed to save time, labor, and stock in forming wire bundles, and is especially adapted to be used in bundling wire after galvanizing the same. The spool is supported or held by its axle F in any ordinary spooling-machine, which may be given a rotary motion by the usual mechanism.

I am aware that it is not new to provide a spool with a flange at one side and free at the other, having at the free side pins riveted to an interior radial slide-piece which engages at its inner end curved slots of a disk, the disk turning loosely on the shaft of the drum and secured by suitable nuts, and therefore do not claim such broadly.

Having described this invention, what I claim, and desire to secure by Letters Patent, is—

A wire-reeling spool or block having a flangeless side provided with radial guides or ways $d$, and arms or fingers $e$ sliding in connection therewith, a disk-head, G, loose on the shaft, connections H, pivoted to the disk-head, and sliding arms or fingers, the handle K, and spring $s$, all constructed, combined, and adapted to operate substantially as specified.

In testimony whereof I affix my signature in presence of two witnesses.

JOSEPH M. YOUNG.

Witnesses:
   CHAS. A. KARR,
   DAVID P. COBAUGH.